Feb. 9, 1960 G. W. ROSSITER 2,924,036
DISPLAY AND AMUSEMENT DEVICES
Filed Oct. 21, 1952 4 Sheets-Sheet 1

Inventor
GEOFFREY WILLIAM ROSSITER
By [signature]
Attorney

Feb. 9, 1960    G. W. ROSSITER    2,924,036
DISPLAY AND AMUSEMENT DEVICES
Filed Oct. 21, 1952    4 Sheets-Sheet 2

Inventor
GEOFFREY WILLIAM ROSSITER
By *Frederick E. Hane*
Attorney

Feb. 9, 1960　　　　　G. W. ROSSITER　　　　2,924,036
DISPLAY AND AMUSEMENT DEVICES

Filed Oct. 21, 1952　　　　　　　　　　　4 Sheets-Sheet 3

Inventor
GEOFFREY WILLIAM ROSSITER
By Frederick L. Hahn
Attorney

Feb. 9, 1960  G. W. ROSSITER  2,924,036
DISPLAY AND AMUSEMENT DEVICES
Filed Oct. 21, 1952  4 Sheets-Sheet 4

Inventor
GEOFFREY WILLIAM ROSSITER
By
Attorney 2,924,036

DISPLAY AND AMUSEMENT DEVICES

Goeffrey William Rossiter, London, England

Application October 21, 1952, Serial No. 316,039

Claims priority, application Great Britain November 14, 1951

5 Claims. (Cl. 40—138)

This invention relates to devices for use in advertising, or for display, entertainment or decoration.

A device which is coming into increasing use in advertising is one consisting of a series of elements which are suspended from one another by means of threads or the like. Usually each element is supported by a thread attached to it at one point only so that there is little restraint to rotation of the element, but an element may have attached to it one, two or more threads to support further elements in the same way. When the device is suspended it is sensitive to the lightest air currents, which cause the element to rotate. Such a device is known as a mobile, and obviously lends itself not only to advertising, but also to display, amusement or decoration.

When a mobile is in use it is most desirable that, firstly, the various elements should assume a desired attitude and, secondly, that as the elements rotate they should not foul one another—unless some special effect is required such as the making of an electrical contact or ringing a bell. This means that the points of attachment of the threads to the elements must be carefully chosen, and the lengths of the threads are also important.

When a mobile is made in quantity, the attachment of the various threads, of correct length to the correct points, is a slow and therefore costly procedure.

Further when the mobile has been completed, consisting as it does of the elements joined by the threads, it is very liable to become damaged or entangled in transit, and so it is necessary to use somewhat elaborate packing, which again adds to the time and cost of manufacture.

The present invention has for its object to provide a method of manufacturing a mobile by which it is possible greatly to simplify the attachment of the threads. The invention also has for its object to provide a mobile, or the constituent elements thereof, in a form which is readily packaged for transit and with less danger of damage to the parts than hitherto.

According to the invention at least some, and maybe all, of the elements of the mobile are made from sheet material such as cardboard, strawboard or the like. These elements are substantially severed, but not detached from a sheet of the material, and the elements are so located on the sheet that the points to which the threads are to be attached are separated by a distance which is predetermined relative to the length of thread which will be required in the finished mobile. Thus in the simplest case, the elements are so located that the points are separated by a distance which is equal to the desired length of thread. It is then possible to connect the thread directly between these points, thus ensuring that the correct length of thread exists between the attachment points.

Alternatively, instead of attaching thread directly between two attachment points, tongues or the like can be formed on or attached to the sheet so that the thread can be passed from one point of attachment round a tongue, to the second attachment point. In this way, with a trifling modification more latitude in locating the elements on the sheet is obtained. It will be appreciated that with either method it is not necessary that the elements be located in the same relative positions that they adopt in the finished mobile.

If the mobile is to be used for advertising purposes, then the necessary threads are attached to the element in the factory. The complete sheet may then be despatched to the customer, in which case no additional packing is required and the only unpacking which the customer has to do is to push the elements out of the sheet. In general, the elements will be printed on both sides to provide a highly decorative and attractive advertising sign.

If however, the mobile is intended, for example, for a child's toy, then the colouring of the elements and the attachment together may be left to the child. In this case, the elements may be left blank and without threads attached and printed instructions on the sheet will make the assembly clear.

Further features and advantages of the invention will appear from the following description of embodiments thereof, given by way of example, in conjunction with the accompanying drawings in which.

Figure 1:
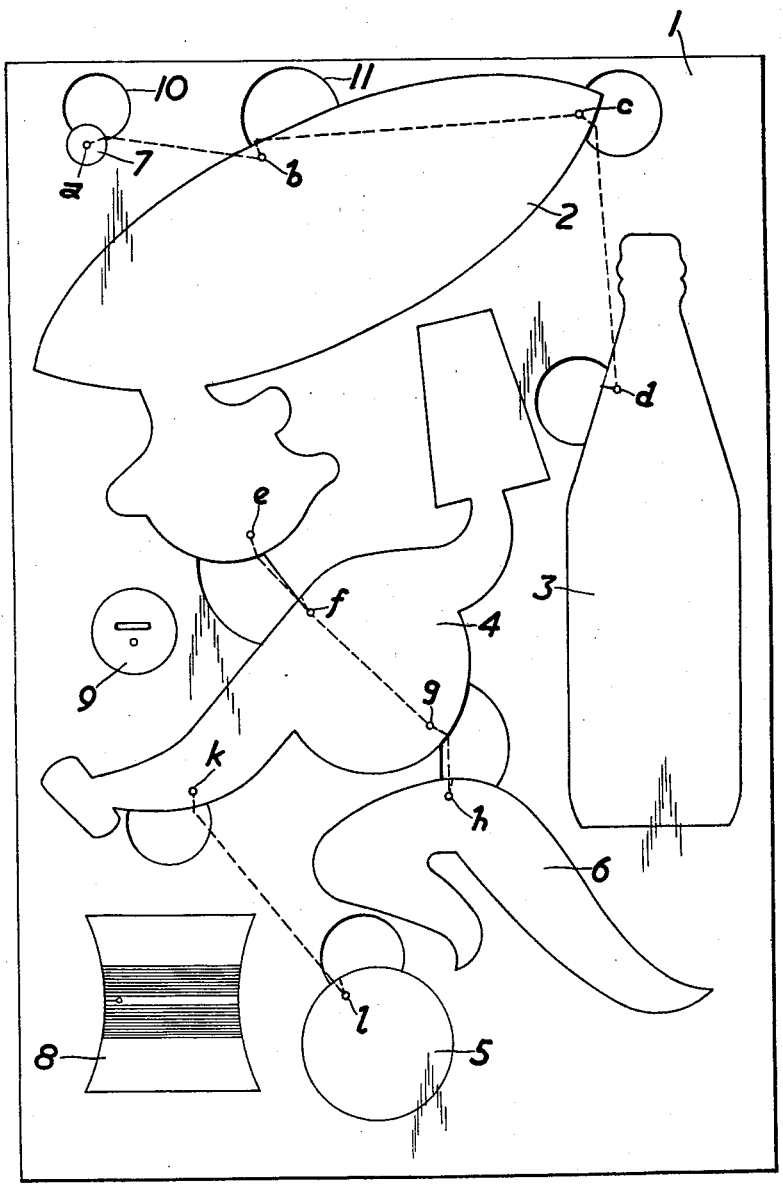
Figure 1 is a plan view of a mobile completed, but before the elements thereof are broken out the sheet of material from which they are made.

In Figure 1, from a sheet 1 of cardboard, strawboard or other suitable material are formed the elements 2, 3, 4, 5 and 6 of a mobile. In Figure 1 for simplicity the elements are shown blank, as they might be if the mobile is to be used as a toy. If the mobile is to used for advertising, the elements are printed, in register, on both sides of the card. The element on the reverse side can be a mirror image of that on the obverse, or it may be different, as ingenuity permits.

The elements are formed by severing the sheet along the outlines of the elements by a shaped knife of known type. If the card is comparatively thick, the outlines may be completely cut but left unstripped, while if the card is thinner, it may be necessary to leave uncut gaps which are broken when the elements are pushed out of the sheet.

Element 2 is arranged to have connected to it further elements 3 and 4, while the element 4 in its turn has additional elements 5 and 6 arranged to be suspended from it. In addition to this, the card includes a small disc 7 by which the mobile is to be suspended, a winder 8 for a length of suspension thread, and a further disc 9 through which the thread is passed from the winder 8. For the thread any suitable material can be used, but because of its strength, and the fact that it is somewhat transparent a Nylon monofil thread is preferred.

In connecting the elements together, a length of thread is first sewn to the point $a$ at the centre of the disc 7. In order to facilitate this sewing operation, a hole 10 is provided in the card 1 through which a needle may readily be passed. The thread is then extended along the dotted line to a point $b$ on the main element 2, where it is again attached by sewing, a hole 11 being provided for this purpose. The thread is then extended along the dotted line to the point c on the right hand side of the element 2, where it is again sewn in position. The portion of thread between the points b and c performs no useful purpose, but it is extended in this manner to avoid the necessity for using a large number of separate lengths of thread.

From the point c, the thread extends to the point d on the element 3, which is in the shape of a bottle. A second length of thread is attached to the point e at the bottom of the element 2 and extends to the point f on the element 4. It then extends across the element 4 to the point g and thence to the point h on the element 6. A short length of thread extends between the points k on the element 4 and l on the element 5. At each of the attachment points on the separate elements, the thread is secured in position by sewing and appropriate holes corresponding to those at 10 and 11 are provided in the card.

If the mobile is for use as a toy, the thread may not be attached, but a sufficient length of thread may be provided on winder 8. For a toy, the elements may be blank, the colouring of the elements being left to the user.

After the thread has been attached, the elements of the mobile can be pushed out from the sheet and the mobile suspended by the disc 7. If the length of suspension between the points a and b is insufficient, a further length of thread from the winder 8 may be attached to the disc 7 and secured in position on a support by the disc 9.

Figure 2:
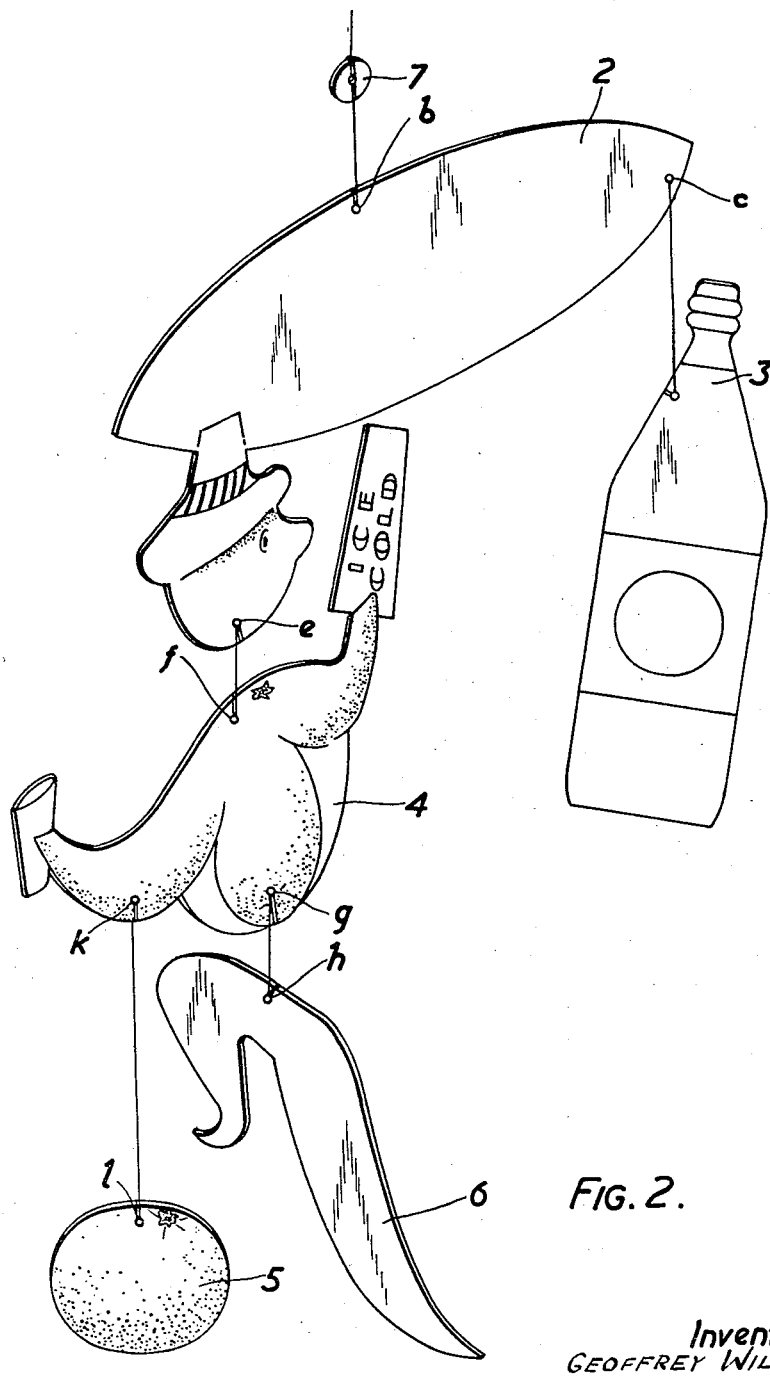
Figure 2 is a perspective view of the mobile of Figure 1, as it might appear suspended in use, and Figure 3, in two parts, is a plan view of an alternative and slightly more complex mobile.

In general however, the elements are printed on both sides, for example, in the manner shown in Figure 2, before the card is cut. One cutting operation serves both to cut the outlines of the elements and also to form the holes 10, 11 and so forth which are provided. The thread is then connected between the various points in the manner already described and the assembly is ready for despatch to the customers. It will be understood of course, that in this condition it is still essentially a flat sheet of card and as such requires no special packing. A stack of such sheets may readily be made into a parcel without any special precautions, and when it is unpacked the customer need only push the elements out of the sheet to render the complete mobile ready for suspension.

Figure 2 shows in perspective the suspended mobile of Figure 1. It will be observed that by reason of the correct location of attachment point h the element 6 assumes an appropriate attitude; by reason of the locations of points f, g and k, and choice of lengths k—l and g—h, the element 4 assumes the desired attitude and in addition the element 6 can rotate about the thread between g and h without fouling element 5. In the same way element 2, by choice of points b, c and e, assumes a desired, and approximately horizontal, attitude.

It may be desirable in some cases to make one or more of the elements of a different material, for example of metal or plastic. In this case, the sheet 1 is stamped in the same way, but the element in question, say, bottle 3 is pushed out and replaced by a correspondingly shaped element of the other material. The assembly and packing then proceeds in the manner previously described.

Figure 3:
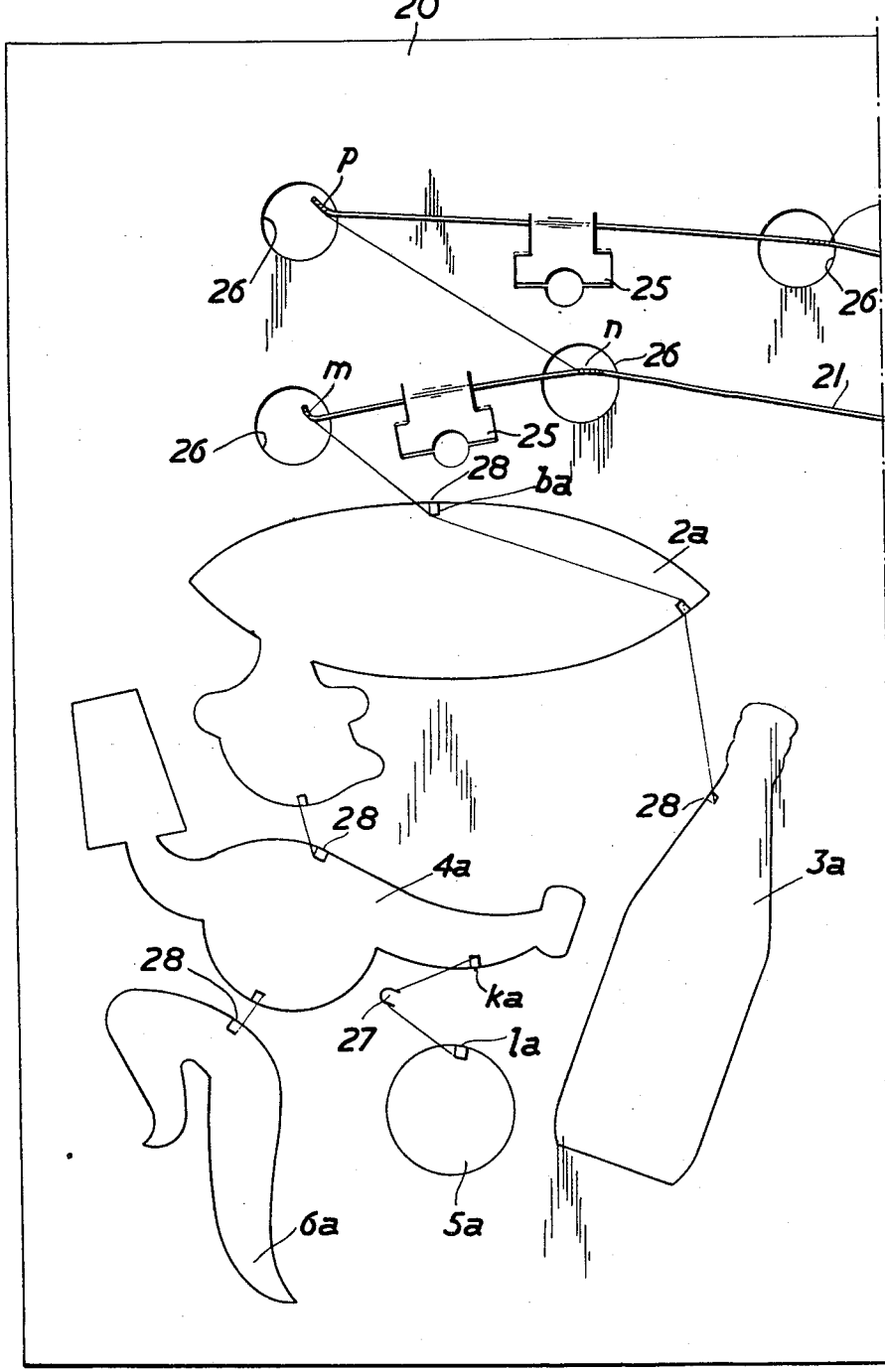
Figure 3:
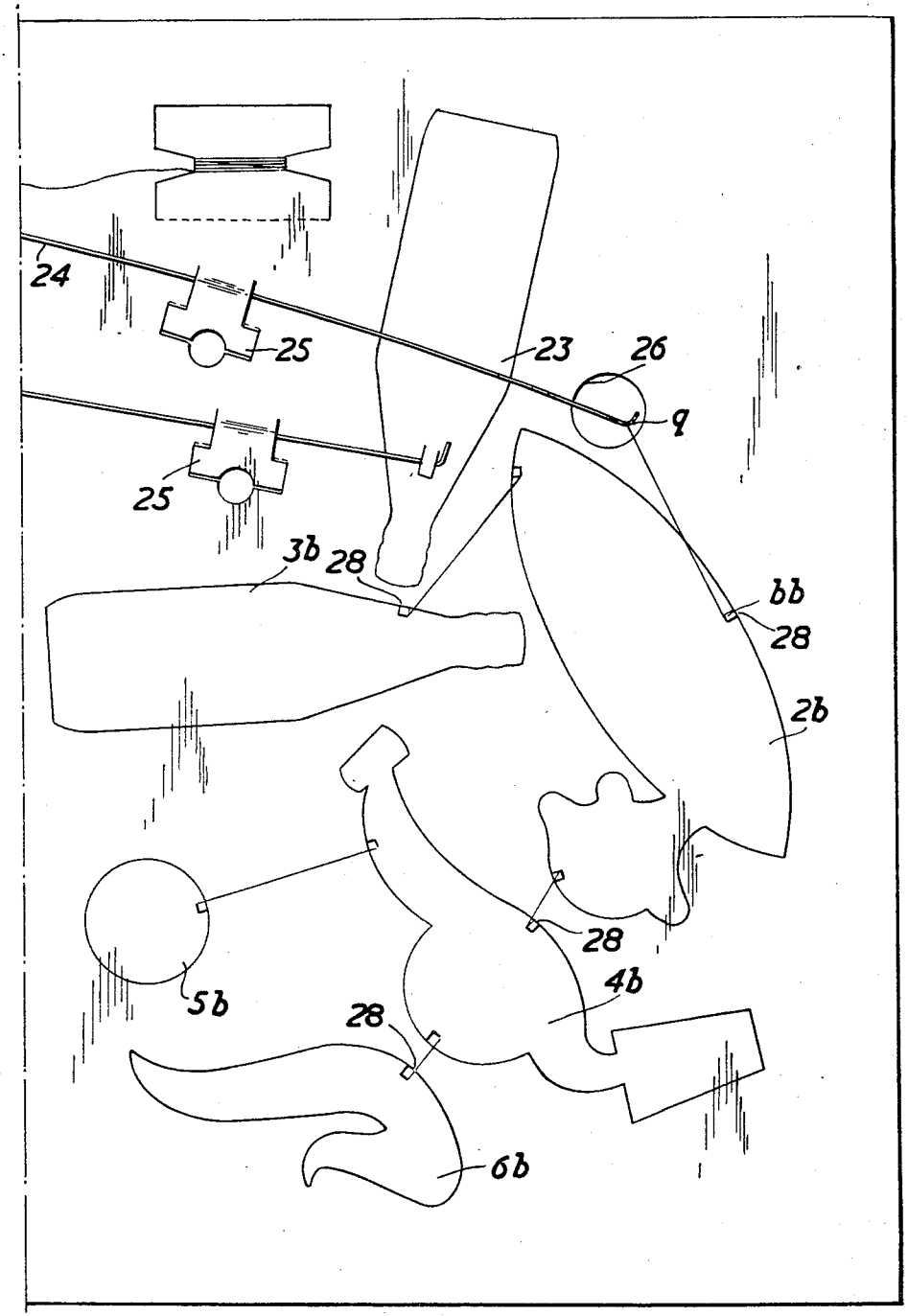

Figure 3 shows a second mobile, using elements of outline similar to the elements of Figures 1 and 2, but with certain modifications. In the first place this mobile has two sets of elements, 2a to 6a and 2b to 6b, which will be readily recognised as being the same as elements 2 to 6, though differently located on card 20. The thread attached to point ba on element 2a is however attached at its other end to a point m on a wire 21, forming one of the elements of the mobile. The wire 21 is itself adapted to be supported by a thread attached at point n, and element 21 is held in use in a near-horizontal position by a further element 23 directly mounted on it. Element 23 is shown as having the shape of a bottle, and the element 21 enters a slit in the bottle.

In turn, wire element 21 is supported, by the thread attached to it at point n, from a further wire element 24. The thread from point n is secured to wire 24 at point p. This wire 24 has attached to its other end at q a thread from point bb on element 2b, and thus supports the second set of elements. The primary suspension thread is attached to the wire 24 at r.

The wires 21 and 24 are held in substantially predetermined position on card 20 by means of tongues 25 formed in the card; by making the ends of the tongues T-shaped as shown, the tongues can be locked in position. Holes 26 are cut in the card adjacent the attachment points m, n, p, q and r to facilitate the securing of the threads to the wires.

The elements of the mobile of Figure 3 are for the most part located on the card in the same fashion as those of the mobile of Figures 1 and 2, that is to say, the distance between the attachment points for the thread extending between two elements is equal to the length of thread required. This is not essential, however, and points ka and la on elements 4a and 5a respectively are arranged at a lesser distance. So that the length of the thread can be easily determined, a tongue 27 is cut out of the card, and the thread is passed round the tongue. As thus diverted, the thread is of correct length. Any device, such as a clip, lug, mandrel or the like, can be used in place of the tongue to divert the thread, and while it is convenient that the device should retain the thread, once the attachment of the thread has been effected, the device can be removed.

Finally in Figure 3 a different method of attachment of the threads to the elements is adopted. In this case tongues, as at 28, are cut in the edges of the elements, and the thread is looped and/or knotted over these tongues.

What I claim is:

1. As an article of manufacture, a flat blank of sheet material formed with severance lines outlining a plurality of elements each severed along substantially its entire outline from the adjacent sheet material but not detached therefrom, the said elements being adapted to constitute the components of a mobile, a plurality of attachment means formed by the blank material for attaching suspension threads to the elements to suspend the latter, one from another, in a predetermined spatial relationship after detachment from the blank, at least one attachment means being disposed within the outline of each element, lengths of thread attached to said attachment means and interconnecting the elements for suspending the latter one from another, and thread retaining means formed by the blank material and disposed outside the outlines of said elements, the said attachment means and the said retaining means being situated at points of the blank spaced apart corresponding to the lengths of thread as required to suspend the elements in the said predetermined relationship, the said retaining means forming detours for the threads extending the length of thread required to interconnect two respective elements beyond the distance as represented by the positions of the said respective elements within the blank.

2. An article according to claim 1, wherein the said attachment means are in form of holes through the blank, the said blank further including holes adjacent to said attachment holes and situated outside of the outlines of said elements for facilitating the attachment of threads to said elements, and wherein the said retaining means comprise tongues formed by the blank material for retaining and detouring a length of thread extending between two attachment holes.

3. An article according to claim 1 and further comprising an element adapted to constitute an additional component of the mobile and removably attached to the blank.

4. An article according to claim 3 and further comprising second retaining means formed by the blank material and disposed outside the outline of said elements for removably retaining said additional element.

5. An article according to claim 4, wherein the said additional element is formed of a wire for suspending therefrom other components of the mobile.

References Cited in the file of this patent

UNITED STATES PATENTS

| | | |
|---|---|---|
| 442,629 | Lipscomb | Dec. 16, 1890 |
| 1,028,147 | Stranders | June 4, 1912 |
| 1,737,733 | Scherotto | Dec. 3, 1929 |
| 2,213,666 | Burke | Sept. 3, 1940 |
| 2,616,199 | Robins | Nov. 4, 1952 |
| 2,735,203 | Berger et al. | Feb. 21, 1956 |